O. W. GOSLEE.
Cultivator.
No. { 880, 31,884. }
Patented Apr. 2, 1861.
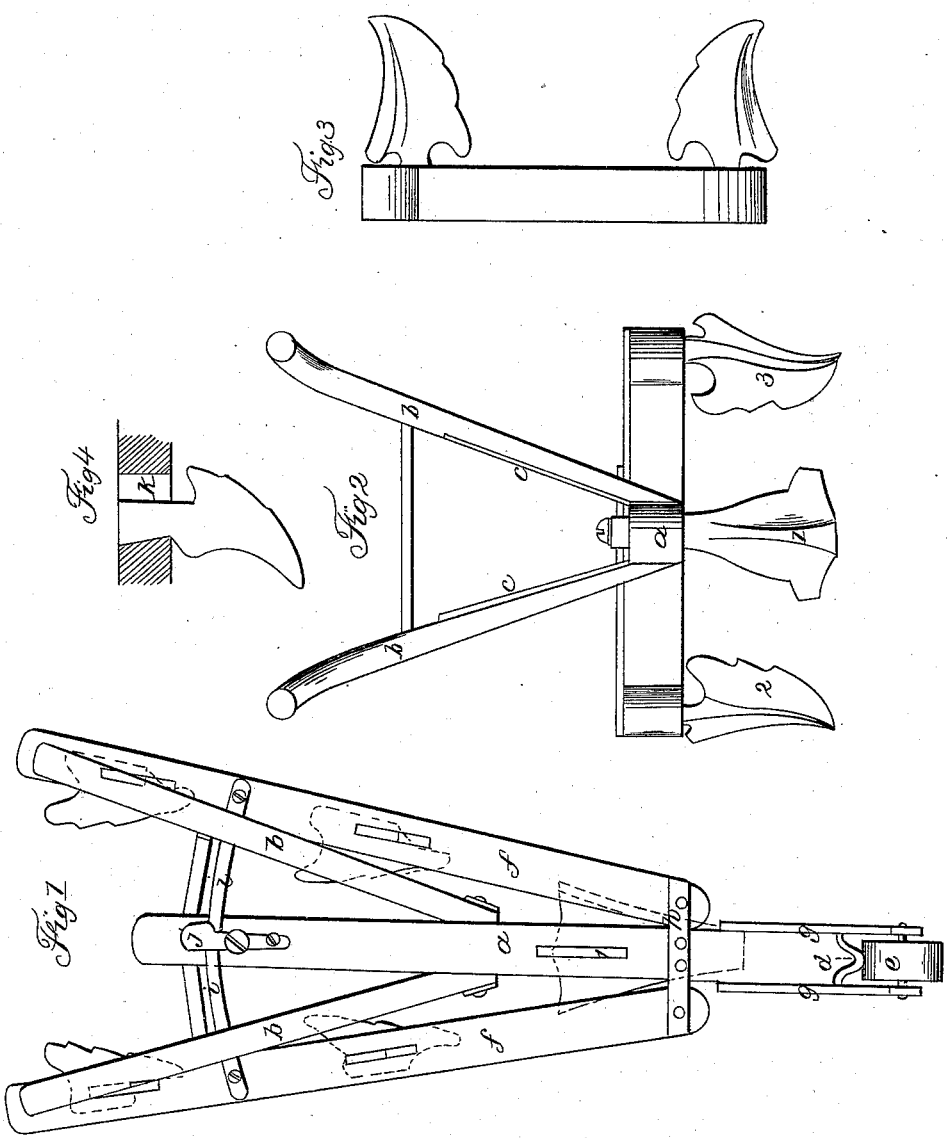

UNITED STATES PATENT OFFICE.

O. W. GOSLEE, OF GLASTONBURY, CONNECTICUT.

IMPROVEMENT IN CULTIVATORS.

Specification forming part of Letters Patent No. 31,884, dated April 2, 1861.

*To all whom it may concern:*

Be it known that I, OZIAS W. GOSLEE, of Glastonbury, county of Hartford, and State of Connecticut, have invented certain new and useful arrangements of old parts which, when combined, constitute a Cultivator and a Hoe; and I do hereby declare that the same is described and represented in the following specification and drawings.

To enable others skilled in the art to make and use my said improvement, I will proceed to describe its construction and operation, referring to the drawings, in which the same letters indicate like parts in each of the figures.

The nature of this improvement consists in the arrangement and combination of old devices or parts in a new form, whereby I am enabled to combine in one machine a cultivator and a hoe by simply changing the teeth from one side to the other, or by reversing sides of the right and left teeth in the frame-work, and to produce a cheaper and more useful implement when considered in its double capacity.

In the accompanying drawings, Figure 1 shows a top view of my improvement. Figs. 2, 3, and 4 show the position in which the teeth are secured to the frame-work.

$a$ is the center or draft bar, having handles $b$ secured thereto (similar to those of the common plow) by means of bolts, screws, or rivets, and supported and held in the proper position by means of braces $c$. Upon the front end of the draft-bar $a$, I secure two semicircular plates, $g$, between or in which I arrange a draft-eye, $d$, and a ground-wheel, $e$. The first may be changed (by loosening the bolts through the draft-bar $a$) forward or backward, as desired, and the latter may be raised or depressed by raising or lowering the back end of the said plates in the common or in the ordinary way. $f$ are side draft-bars secured by the forward ends—one on each side of the bar $a$—just back of the plates $g$ and between the plates $h$, forming a hinge or joint, so as to allow the bars $f$ to be thrown open or closed up more or less, as desirable, and the back ends of which are held in the desired position by the curved arms $i$, one end of which is secured in its proper place and manner to the bar $f$, and the two lap one over the other between the bar $a$ and the clamp $j$, by which (the clamp $j$) the outer bars, $f$, are held firmly in the desired position and place. The teeth 2 and 3 are made in the shape (see Fig. 3) so as to hoe up the earth or soil toward the hill as they pass along between the rows after the breaker 1. These hoe-teeth (2 3) are provided with a dovetailed shank, $l$, so that they may be easily secured and changed or removed from one side to the other by simply removing the keys $k$.

1 is a breaker for breaking up the ground, secured near the front end of the draft-bar $a$ by means of a mortise, $n$, and key $k$.

2 and 3 are right and left cultivator or hoe teeth, the dovetail shanks of which are made in a proper manner to be easily fitted into mortises made through the center of the bars $a$ and $f$, and are secured in the said mortises by means of keys $k$. The teeth as here shown are placed in the proper manner for a cultivator; but it will be readily seen that by simply loosening the keys $k$ the tooth 3 may be changed into the place of the tooth 2, and the tooth 2 may take the place of the tooth 3, thus changing the character of the implement from that of a cultivator to a hoe, as it will be noticed that in the first place the ground is first opened in the center by the tooth 1 and thrown together to the center by the teeth 2 and 3, and in changing the teeth 2 and 3, as described, will throw the ground outward or up to the hill or stalk, thus changing the implement from a cultivator to a hoe; and by means of the adjusting-arms $i$ the soil may be thrown more or less up to the hill or stalk, as desired.

By the use of the adjustable ground-wheel $e$, in combination with the breaker 1 and the hoe or cultivator teeth (2 3) and their ready means of change or adjustment, I am enabled to break up the ground more or less, as it (the wheel $e$) governs the depth that the teeth are allowed to enter the ground, thereby avoiding cutting up the roots or hoeing too much earth up to the hill of corn, &c.

Now, I do not claim any of the parts, when separately considered, as being of my invention; but

What I claim, and desire to secure by Letters Patent, is—

The arrangement of the frame $a$ $f$, arms $i$, handles $b$, braces $c$, plates $g$, clevis $d$, axle $e$, and cultivator-teeth 1 2 3, the whole being constructed in the manner and for the purpose described.

In witness whereof I have hereunto set my hand and seal this 29th day of June, 1860.

OZIAS W. GOSLEE. [L. S.]

Witnesses:
 S. A. HUMPHREY,
 JEREMY W. BLISS.